(12) United States Patent
Kikkawa et al.

(10) Patent No.: US 6,330,043 B1
(45) Date of Patent: Dec. 11, 2001

(54) LIQUID CRYSTAL DISPLAY DEVICE AND METHOD OF FABRICATION TFT PANEL

(75) Inventors: Hironori Kikkawa; Takahiko Watanabe; Hirofumi Ihara; Shinichi Nakata; Mamoru Okamoto; Yuji Yamamoto; Michiaki Sakamoto, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/552,035

(22) Filed: Apr. 19, 2000

(30) Foreign Application Priority Data

Apr. 20, 1999 (JP) .................................................. 11-112008

(51) Int. Cl.[7] ...................................................... G02F 1/136
(52) U.S. Cl. .............................. 349/43; 349/106; 349/138
(58) Field of Search .............................. 349/106, 43, 138

(56) References Cited

U.S. PATENT DOCUMENTS 5,949,507 * 9/1999 Shimada et al. ..................... 349/113
5,986,723 * 11/1999 Nakamura et al. ..................... 349/39
6,118,505 * 9/2000 Nagata et al. ....................... 349/106

FOREIGN PATENT DOCUMENTS 9-152625  6/1997  (JP) .
10-206888  8/1998  (JP) .

* cited by examiner

*Primary Examiner*—James A. Dudek
(74) *Attorney, Agent, or Firm*—McGinn & Gibb, PLLC

(57) ABSTRACT

An LCD including a pair of transparent dielectric substrates, liquid crystal sandwiched between the transparent dielectric substrates; a TFT formed overlying the first transparent dielectric substrate, a first dielectric film made of non-photosensitive resin and a second dielectric film made of photosensitive resin which cover the inner side surface of a through-hole formed in the first and the second dielectric films. The yield and the reliability of the LCD are elevated because of the smooth shape of the second dielectric film.

13 Claims, 8 Drawing Sheets

LIQUID CRYSTAL DISPLAY DEVICE AND METHOD OF FABRICATION TFT PANEL

BACKGROUND OF THE INVENTION (a) Field of the Invention

The present invention relates to a liquid crystal display (LCD) device having an elevated yield and reliability and a method for fabricating a TFT panel included therein.

(b) Description of the Related Art

Figure 1:
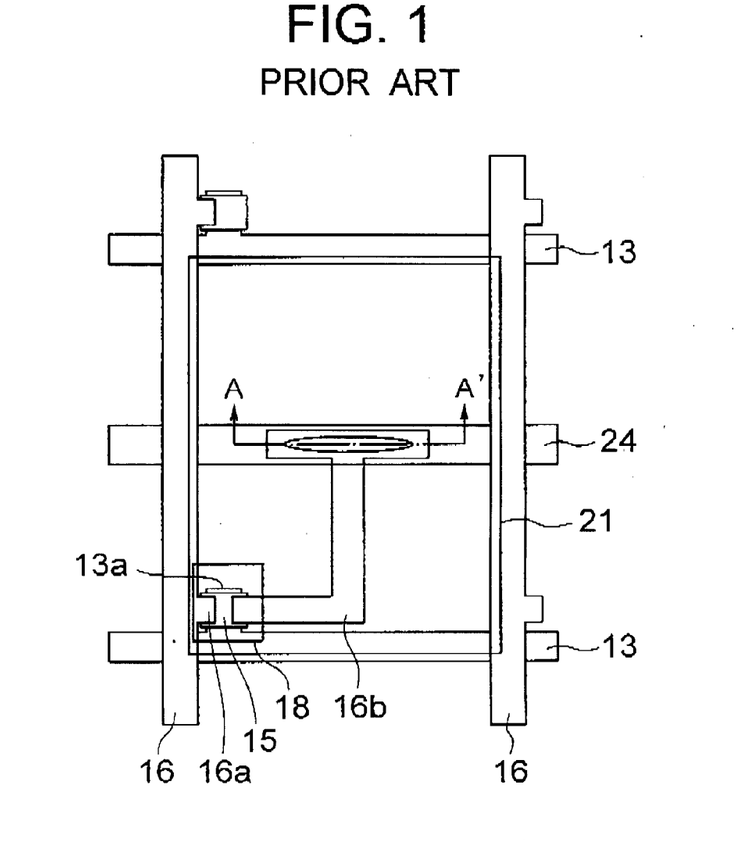
FIG. 1 is a top plan view showing an example of a conventional LCD.
Figure 2:
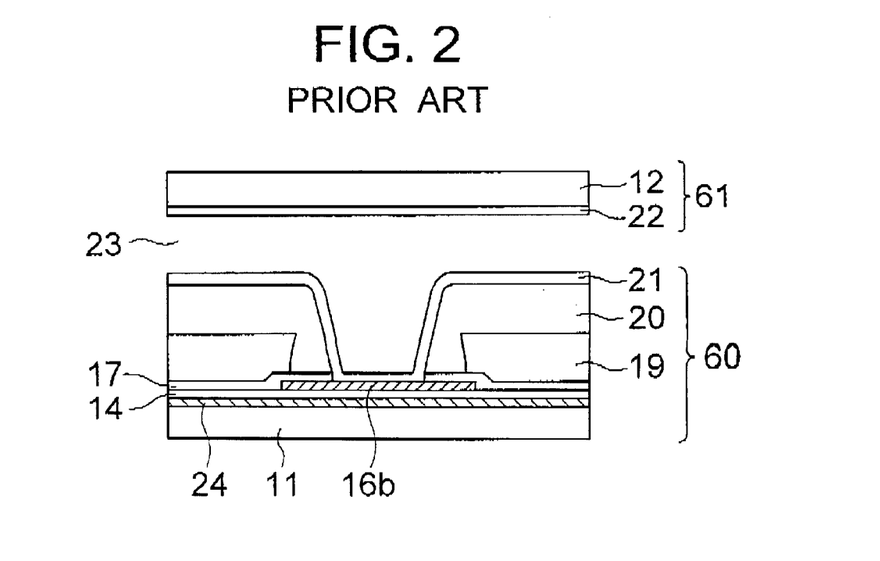
FIG. 2 is a cross sectional view of the conventional LCD of FIG. 1 taken along a line A-A'.

A conventional LCD described in JP-A-10(1998)-206888 shown in FIGS. 1 and 2 includes a TFT (thin film transistor) panel 60 and a counter panel 61. The counter panel 61 includes a transparent dielectric substrate 12, a transparent counter electrode 22 and a liquid crystal (LC) orientation layer (not shown) disposed on the counter electrode 22.

The TFT panel 60 includes a transparent dielectric substrate 11 on which a common electrode 24, scan lines 13 and a gate electrode 13a connected thereto are disposed. A gate dielectric film 14, a semiconductor layer 15, signal lines 16, a source electrode 16a connected thereto, a drain electrode 16b, and a passivation layer 17 are disposed on the common electrode 24.

A black matrix 18, a color filter 19 made of photosensitive color resin and an overcoat 20 made of photosensitive transparent resin are disposed on the passivation layer 17. Through-holes are formed in the color filter 19 and the overcoat 20.

A transparent pixel electrode 21 connected to the drain electrode 16b through the through-hole is disposed on the overcoat 20.

The TFT panel 60 and the counter panel 61 are disposed so that the respective LC orientation layers not shown are opposed to each other, and an LC layer 23 is interposed between the LC orientation layers.

FIGS. 3A to 3D show consecutive steps for fabrication of the LCD of FIGS. 1 and 2.

The common electrode 24, the scan lines 13 and the gate electrode 13a are formed on the transparent dielectric substrate 11 by means of patterning as shown in FIG. 2. After formation of the gate dielectric electrode 14 on the common electrode 24, the drain electrode 16b and the passivation film 17 are formed.

Figure 3A:
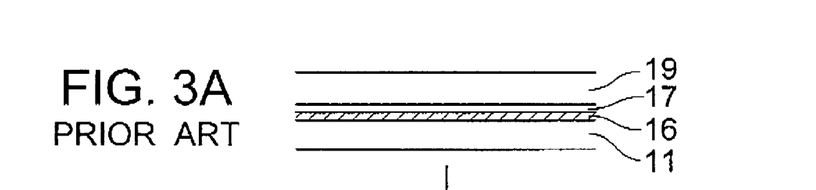
FIGS. 3A to 3E are schematic cross sectional views showing a method of fabricating the LCD shown in FIG. 1.
Figure 3B:
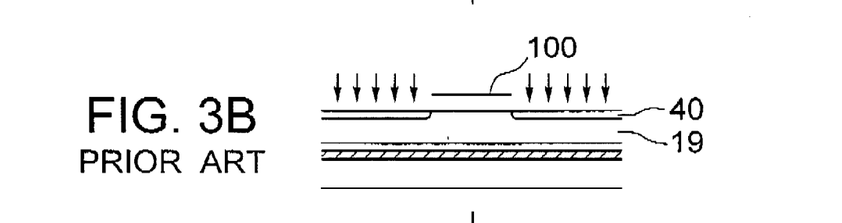
Figure 3C:
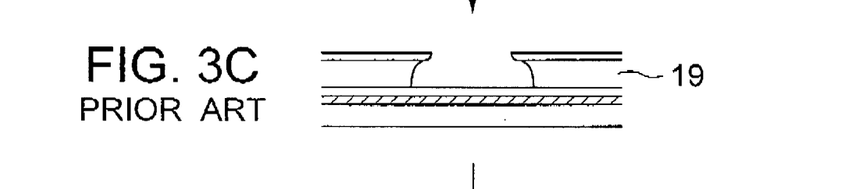
Figure 3D:
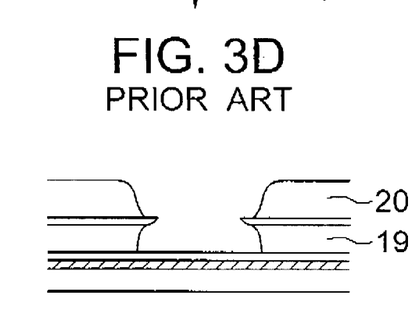
Figure 3E:
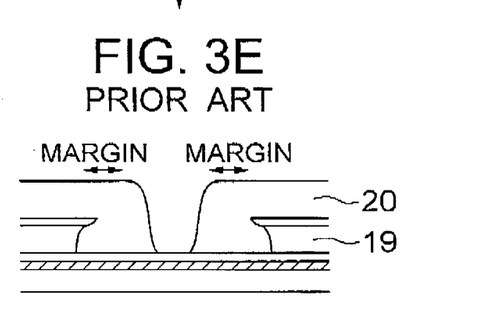

Then, after the color filter 19 is formed on the passivation film 17 as shown in FIG. 3A and exposed to light by employing a photomask 100 as shown in FIG. 3B, etching is conducted as shown in FIG. 3C to form the overcoat 20 and the transparent pixel electrode 21 as shown in FIG. 3E, thereby forming the TFT panel 60 shown in FIG. 2.

Then the LCD shown in FIG. 2 is fabricated by disposing the LC layer 23 between the counter panel 61 and the TFT panel 60 and bonding the TFT panel 60 and the counter panel 61 with each other.

Figure 4:
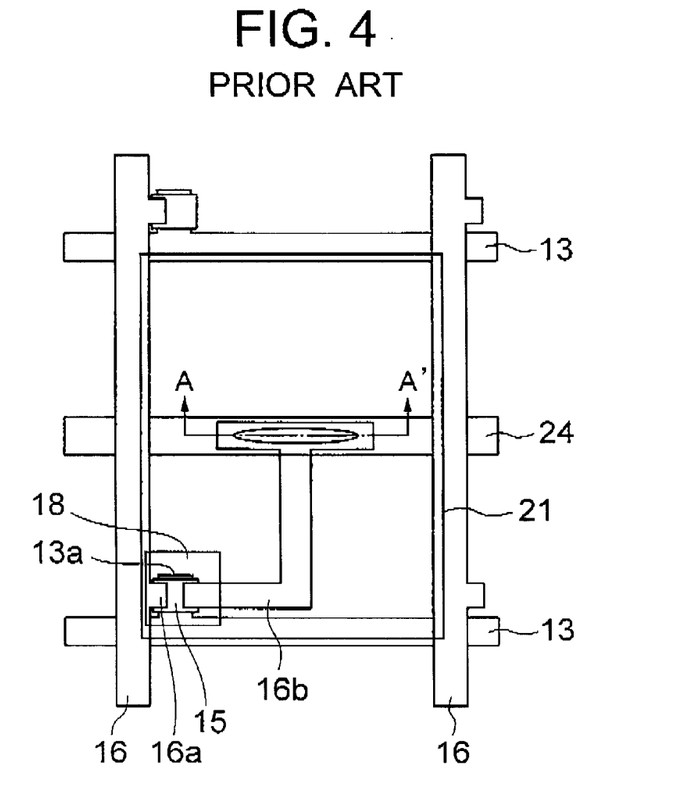
FIG. 4 is a top plan view showing another conventional LCD.
Figure 5:
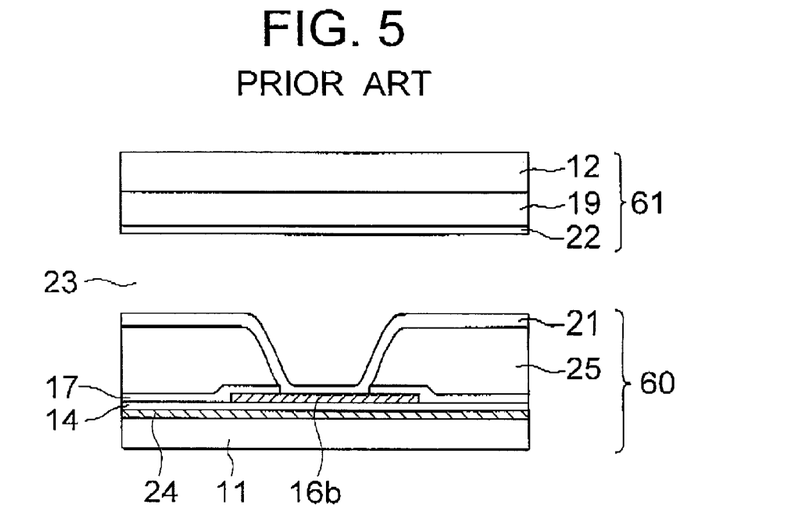
FIG. 5 is a cross sectional view of the conventional LCD of FIG. 4 taken along A-A'.

Another conventional LCD described in JP-A-9(1997)-152625 shown in FIGS. 4 and 5 similarly includes a TFT panel 60 and a counter panel 61.

The counter panel 61 includes a transparent dielectric substrate 12, a black matrix 18, a color filter 19, a transparent counter electrode 22 and an LC orientation layer (not shown) disposed on the counter electrode 22.

The TFT panel 60 includes a transparent dielectric substrate 11 on which a common electrode 24, scan lines 13 and a gate electrode 13a connected thereto are disposed. A gate dielectric film 14, a semiconductor layer 15, a signal line 16, a source electrode 16a connected thereto, a drain electrode 16b, and a passivation layer 17 are disposed on the common electrode 24.

An interlayer dielectric film 25 made of photosensitive transparent resin is formed on the passivation layer 17. A transparent pixel electrode 21 connected to the drain electrode 16b through a through-hole is disposed on the interlayer dielectric film 25.

The TFT panel 60 and the counter panel 61 are disposed so that the respective LC orientation layers not shown are opposed to each other, and an LC layer 23 is interposed between the LC orientation layers.

The LCD is fabricated in accordance with the following procedures.

The interlayer dielectric film 25 overlying the transparent dielectric substrate 11 is formed by means of exposure, development and baking by employing the photosensitive transparent resin having a thickness of about 4.5 μm prepared by its application and pre-baking.

The reason for forming the interlayer dielectric film 25 at the thickness of 4.5 μm is as follows. When a coupling capacitance between the signal line 16 and the pixel electrode 21 is small, the potential of the pixel electrode 21 is affected by the signal line 16. The large thickness of the interlayer dielectric film 25 can suppress the potential variation of the pixel electrode 21.

The amount of the potential variation (α) is expressed as the below equation (1), wherein Cpi-s is the coupling capacitance between the signal line 16 and the pixel electrode 21, Clc is a capacitance of LCs between the pixel electrode 21 and the counter electrode 11, and Cstr is an auxiliary capacitance between the pixel electrode 21 and the common electrode 24.

$$\alpha = Cpi\text{-}s/(Cpi\text{-}s + Clc + Cstr) \tag{1}$$

When the interlayer dielectric layer 25 is formed by employing the resin in this manner, the thicker layer can be obtained more easily than in the case of employing a chemical vapor deposition (CVD) procedure. Accordingly, the interlayer dielectric film 25 is formed as thick as possible to reduce the coupling capacitance while disposing the signal line 16 overlapping with the pixel electrode 21. Thereby, the area of the black matrix 18 which conceals a region not related with the display is reduced to increase a rate of the effective display area to the pixel area (aperture rate).

Since a position adjustment accuracy of an optical aligner for fabrication a current LCD is about 0.5 μm, the amount of the overlapping between the signal line 16 and the pixel electrode 21 is required to be about 1 μm.

When acryl-base resin having a relative dielectric constant of 3 is used as the interlayer dielectric film 25, the required film thickness thereof is 3 μm or more for obtaining as small a crosstalk as that of an LCD in which silicon nitride is used as the interlayer dielectric film 25 without overlapping. The layer thickness of about 4.5 μm is necessary in view of the case wherein the patterned dimensions of the pixel electrode 21 and the signal line 16 are larger than expected.

In JP-A-10(1998)-206888, a material having a negative-photosensitivity group is generally used as the photosensitive color resin. Accordingly, a portion exposed by using the photomask 100 as shown in FIGS. 3A and 3B is hardened to form a hardened portion 40. However, the color resin does not allow the light for exposure to reach to a sufficiently deep portion, and only the surface of the color filter 19 is hardened.

The development under such a situation causes the color filter 19 to have an overhang shown in FIG. 3C because the deeper portion is not sufficiently hardened to be easily etched.

If the diameter of the through-hole of the overcoat 20 is larger than that of the color filter 19 when the overcoat 20 is applied and pre-baked on the color filter 19 for the exposure, the development and the baking, the through-hole has such an overhang at the central portion as shown in FIG. 3D to worsen the contact between the pixel electrode 21 and the drain electrode 16b.

In order to prevent this occurrence, the diameter of the through-hole of the overcoat 20 is required to be smaller than that of the color filter 19 as shown in FIG. 3E. An overlapping margin for exposure must be considered to enlarge the diameter. Accordingly, such a problem is involved that the area of the opening becomes narrower and the rate of the aperture rate becomes lower.

On the other hand, in JP-A-9(1997)-152625, positive photosensitive resin is generally used for forming the interlayer dielectric layer having the through-hole. This is because the removal of a non-exposed portion after the development, which may be generated by, for example, dusts mixed therein when the negative resin is used, can be prevented by employing the positive resin. If the removal of the non-exposed portion occurs, through-holes are formed in unintended portions to cause a short-circuit failure.

When, however, the positive resin is used, a portion not removed by development remains or an unreacted photosensitive group remains in the non-exposed portion to reduce a transmission factor. Even if light is irradiated on the entire surface to react the photosensitive group after the development, the transmission factor of the ordinary positive transparent resin is lower than that of the negative resin.

When, for example, positive acryl resin PC403 available from JSR Kabushiki Kaisha having a thickness of 4.5 $\mu$m is used, a transmission factor in a visible light band is 95% in average. The transmission factor at the wavelength band between 350 and 420 nm in which the photosensitive group is reacted with light is especially lower, and a part of white problematically becomes yellow.

SUMMARY OF THE INVENTION

In view of the foregoing, an object of the present invention is to provide an LCD having elevated yield and reliability and a method of fabricating a TFT panel included therein.

The present invention provides, in a first aspect thereof, a liquid crystal display (LCD) device including: first and second transparent panels; and liquid crystal sandwiched between the first transparent panel and the second transparent panel, the first transparent panel including a dielectric substrate, a plurality of pixel elements arranged in a matrix overlying the dielectric substrate, each of the pixel elements having a TFT, an associated pixel electrode, and first and second dielectric films covering the TFT and having a through-hole for the TFT, a plurality of scan lines each connected to gates of the TFTs in a corresponding row of the pixel elements, a plurality of signal lines each connected to source electrodes in a corresponding column of the pixel elements, and drain electrodes connected to the pixel electrode via the through-holes, the first dielectric film being made of non-photosensitive resin, the second dielectric film being made of photosensitive resin and covering an inner side wall of each said through-hole.

In accordance with the first aspect of the present invention, the yield and the reliability of the LCD are elevated because the side surface of the through-hole formed in the first and the second dielectric film is covered with the smooth shape of the second dielectric film.

The present invention provides, in a second aspect thereof, a method for fabricating a TFT panel for use in an LCD device, including the steps of: forming a TFT overlying a first transparent dielectric substrate; forming a non-photosensitive first dielectric film overlying the TFT; forming a photosensitive second dielectric film on the first dielectric film; exposing the second dielectric film to light by using a photomask to form a wafer; dipping the wafer in an alkaline developer for development; exposing the wafer for exposure; heating the second dielectric film at a temperature higher than a glass transition point of the second dielectric film; and forming a pixel electrode overlying the second dielectric film.

In accordance with the second aspect of the present invention, the second dielectric film which covers the side surface of the through-hole is smoothly transformed to secure the connection between elements existing near the top and bottom portions of the through-hole.

The above and other objects, features and advantages of the present invention will be more apparent from the following description.

PREFERRED EMBODIMENTS OF THE INVENTION

Now, the present invention is more specifically described with reference to FIGS. 6 to 12 in which the same numeral used in FIGS. 1 to 5 is attached to an element the same as or similar to that shown in FIGS. 1 to 5.

First Embodiment

Figure 6:
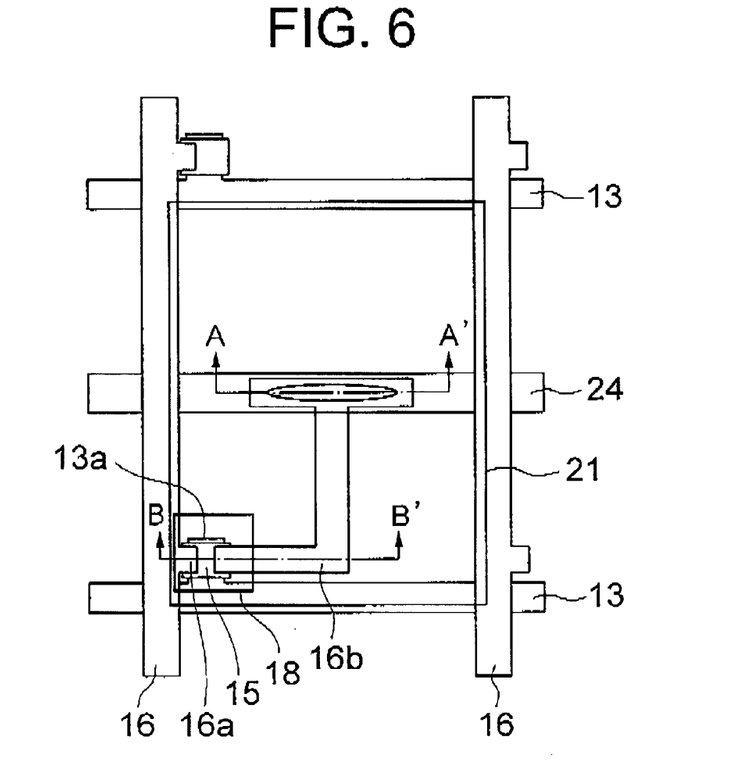
FIG. 6 is a top plan view showing an LCD in accordance with a first embodiment of the present invention.
Figure 7:
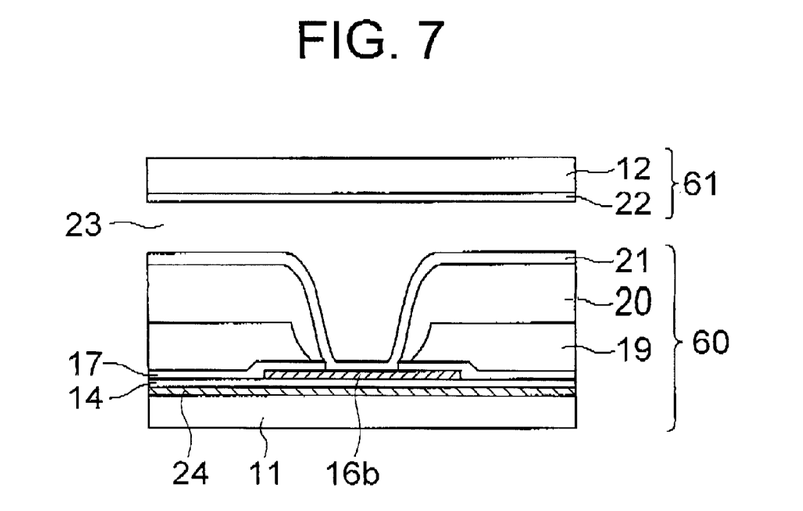
FIG. 7 is a cross sectional view of the LCD shown in FIG. 1 taken along a line A-A'.
Figure 8:
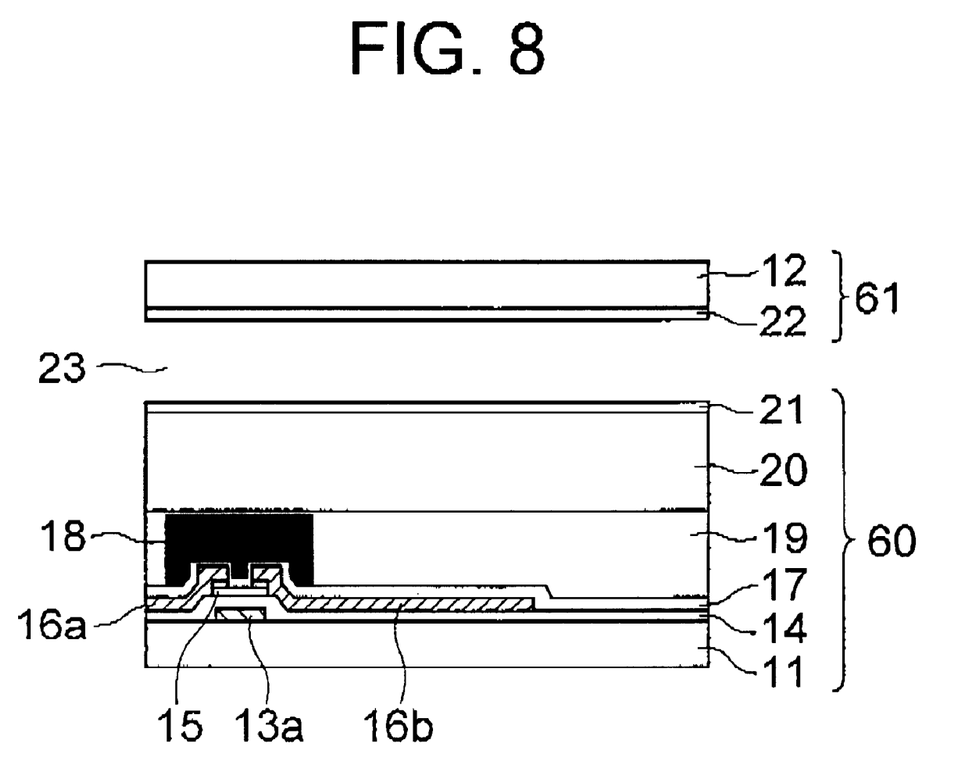
FIG. 8 is a cross sectional view of the LCD shown in FIG. 1 taken along a line B-B'.

As shown in FIGS. 6 to 8, an LCD includes a TFT panel 60 and a counter panel 61. The counter panel 61 includes a transparent dielectric substrate 12, a transparent counter electrode 22 and an LC orientation layer (not shown) disposed on the counter electrode 22.

The TFT panel 60 includes a transparent dielectric substrate 11 on which a common electrode 24, scan lines 13 and a gate electrode 13a connected thereto are disposed. A gate dielectric film 14, a semiconductor layer 15, signal lines 16, a source electrode 16a connected thereto, a drain electrode 16b, and a passivation layer 17 are disposed on the common electrode 24.

A black matrix 18, a color filter 19 acting as a first dielectric film made of non-photosensitive color resin, and an overcoat 20 made of photosensitive transparent resin and acting as a second dielectric film are disposed on the passivation layer 17. Through-holes are formed in the color filter 19 and the overcoat 20.

A pixel electrode 21 connected to the drain electrode 16b through a through-hole not shown in the drawing is disposed on the overcoat 20.

The TFT panel 60 and the counter panel 61 are disposed so that the respective LC orientation layers are opposed to each other, and an LC layer 23 is formed between the LC orientation layers.

A method of fabricating the LCD having the configuration will be described referring to FIGS. 9A to 9E.

Figure 9A:
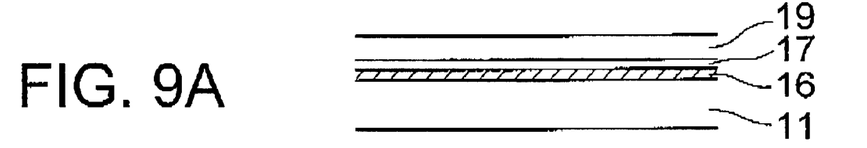
FIGS. 9A to 9E are schematic cross sectional views showing a method of fabricating the LCD shown in FIG. 6.

After a chromium film is formed on the dielectric substrate 11 by sputtering and photolithographic patterning, the scan lines 13, the gate electrode 13a and the common electrode 24 are formed.

Then, a silicon nitride film acting as the gate dielectric film 14 is formed on the entire surface by a CVD procedure. Non-doped amorphous silicon (hereinafter "a-Si") and n$^+$-doped amorphous silicon (hereinafter "n$^+$-a-Si") are successively formed on the gate dielectric film 14 by the CVD procedure to provide the semiconductor layer 15 after the patterning.

The n$^+$-a-Si secures an ohmic contact between the drain electrode 16b and the a-Si and between the source electrode 16a and the a-Si. Then, a chromium film is formed by sputtering on the semiconductor layer 15 and patterned to provide the signal line 16, the source electrode 16a and the drain electrode 16b.

Then, dry etching is conducted by employing a gas for etching the n$^+$-a-Si to remove the n$^+$-aSi positioned between the source electrode 16a and the drain electrode 16b. The removal prevents a direct current flow between the source electrode 16a and the drain electrode 16b by way of the n$^+$-a-Si.

Thereafter, a silicon nitride film is formed by the CVD procedure and patterned to provide the passivation layer 17. The passivation layer 17 prevents malfunction of the TFT due to contamination of impurities such as an ion into the semiconductor layer 15.

On the TFT thus fabricated, black resin prepared by dispersing black pigment in an acryl-based photosensitive polymer is photolithographically patterned to provide the black matrix 18.

The highly nonconductive black resin is preferably employed. The low nonductivity of the black resin provides a somewhat potential to the black resin itself disposed on the TFT to prevent activation of the back channel of the transistor for realizing an excellent display.

Then, a non-photosensitive material prepared by dispersing pigments of R.G.B (red-green-blue) in the acryl-based polymer is applied to have a thickness of about 1 μm by spin-coating. A solvent is volatized by pre-baking the wafer at 100° C. on a hot plate for 1 minute to provide the color filter 19.

The temperature and the length of time of the pre-baking for forming the color filter 19 are preferably between 60 and 100° C. and between 30 seconds and 5 minutes, respectively. The higher temperature and the longer period of time lower an etching rate mentioned below.

Figure 9B:
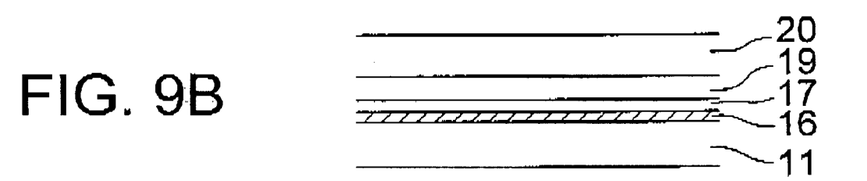

Then, positive photosensitive and highly transparent resin material is spin-coated on the color filter 19 and pre-baked for 1 minute on a hot plate having a temperature of 80° C. to provide the overcoat 20 as shown in FIG. 9B. The solvent for the overlying overcoat 20 is selected not to invade the underlying color filter 19.

An acrylic base material, a polyimde base material and BCB (benzocyclobutene) may be used as a resin material for forming the overcoat 20.

The temperature and the length of time of the pre-baking for forming the overcoat 20 are preferably between 60 and 100° C. and between 30 seconds and 5 minutes, respectively. In this case, the temperature thereof is preferably lower than that for forming the color filter 19 to avert an influence to the underlying layer.

Figure 9C:
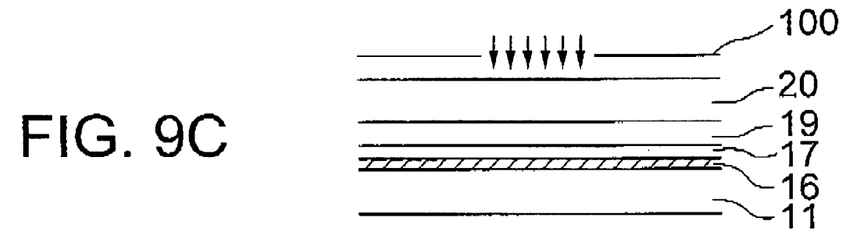

Then, a light having an energy of about 100 mJ/cm$^2$ is irradiated by employing a stepper to expose the overcoat 20 through the photomask 100 as shown in FIG. 9C.

The dielectric substrate 11 is dipped in alkaline developer (containing 2.38% of TMAH: tetramethyl ammonium hydroxide) for 140 seconds for development. The concentration of the TMAH may be selected between 0.1 and 0.4%. The period of the dipping time may be selected between 20 and 350 seconds.

Figure 9D:
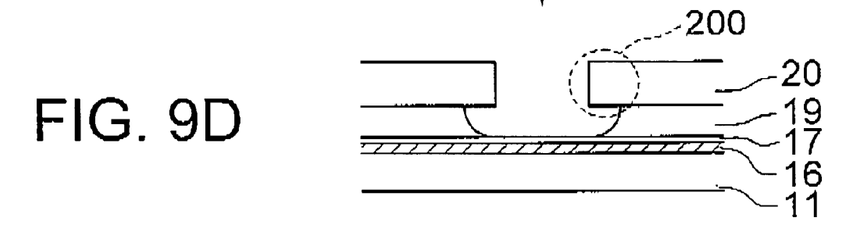

Since the overcoat 20 employed herein is positive, the resin irradiated by the light is dissolved into the developer during the next developing step. The color filter 19 at this stage is formed by only the volatilization of the solvent, and dissolved into an alkaline developer. Accordingly, the wet etching of the color filter 19 is conducted simultaneously with the development as shown in FIG. 9D.

An eaves portion 200 of the overcoat 20 must be formed to have a moderate dimension after the development. If the eaves portion 200 is smaller, the side surface thereof is hardly covered in a later re-flow step.

Basically, the eaves portion 200 is not formed unless the etching rate of the underlying layer is larger than that of the overlying layer. The etching rate is largely dependent on the compositions, the pre-baking temperatures and the periods of time of the pre-baking of the overcoat 20 and the color filter 19. The higher pre-baking temperature and the longer pre-baking period decrease the etching rate. If the pre-baking temperature of the overlying overcoat 20 is higher than that of the underlying color filter 19, the etching rate is hardly controlled because the conditions of the color filter is changed during the pre-baking of the overcoat 20.

Accordingly, the baking temperature of the overlying overcoat 20 must be established lower than that of the underlying color filter 19. Although the etching rate is likely to be high because of the low baking temperature of the overlying overcoat 20, the etching rate can be adjusted by means of the composition of the overcoat 20.

A margin of the developing time must be increased during the actual fabrication in order to accurately determine the diameter of the through-hole and to control the shape of the eaves portion 200. The density of the developer is preferably lowered to increase the margin of the developing time.

When a permitted size of the diameter of the through-hole is assumed to be ±1.5 μm, permitted periods of time deviation are about ±25 seconds for the above developer having 0.3% of the TMAH in which the developing time is 140 seconds, and about ±45 seconds for the developer having 0.15% of the TMAH in which the developing time is 250 seconds.

After the development, the entire surface of the dielectric substrate 11 is exposed to light at an energy density of 300 mJ/cm$^2$. This step facilitates the reaction of the photosensitive group in the overcoat 20 and elevates the transparency.

Figure 9E:
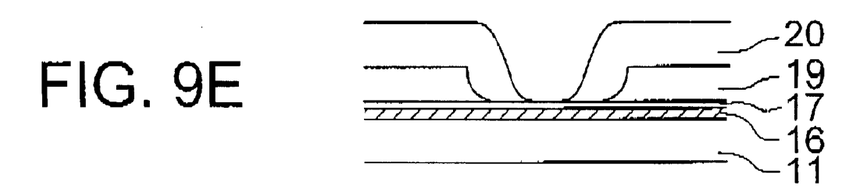

The heating of the wafer at a temperature higher than the glass transition point of the overcoat 20 changes the shape of the overcoat 20 (re-flowing) to form a gradual slope covering the side surface of the through-hole as shown in FIG. 9E.

If the heating temperature is too high, the color filter 19 may be disclosed. Since the heat resistance temperature of the color filter currently available is generally 230° C., the overcoat 20 having the glass transition point lower than generally 230° C. must be used. A range on which the scope is formed is controllable by adjusting the conditions for forming the overcoat 20 and the etching conditions thereof.

The overcoat 20 prevents the contamination of impurities such as an ion eluted from the color filter 19 into the LC layer, controllably achieves the uniform thickness of the LC layer on the surface for leveling the surface of the TFT panel 60, and suppresses generation of discrimination, to attribute to providing an excellent display.

A transparent dielectric film such as a ployimide film can be used as the material of the color filter 19 and the overcoat 20 other than the acryl-based polymer employed herein.

The pixel electrode 21 is formed by preparing an ITO (Indium-Tin-Oxide) film on the overcoat 20 by sputtering and patterning. In this manner, the TFT panel is obtained.

The patterning of the passivation film 17 may be conducted after the formation of the overcoat 20. If etching residues of the overcoat 20 and the color filter 19 are left in the through-hole to worsen the contact, the patterning of the passivation film 17 is preferably conducted after the formation of the overcoat 20 because the etching residues can be effectively removed.

A step of forming the through-hole in the color filter 19 can be conducted similarly to the step of forming the through-hole in the black resin by employing the color resin.

On the other hand, the counter panel 16 is obtained by forming an ITO film on the transparent dielectric substrate 12 by sputtering to form the counter electrode 22.

The respective LC orientation layers made of polyimide are formed on the TFT panel 60 and the counter panel 61 fabricated in this manner.

The both panels 60 and 61 are subjected to a rubbing treatment so that the LC orientation after 90° twist is obtained. After polymer beads having a diameter corresponding to gaps are scattered on the entire surface and the both panels 60 and 61 are superposed with each other and bonded in a manner that the both LC orientation layers oppose to each other, the LCD is fabricated by injecting nematic LCs in the space between the both panels 60 and 61.

In the LCD of the first embodiment described above, after the simultaneous wet etching of the overcoat 20 and the color filter 19, the overcoat 20 is re-flown to form the gradual slope covering the side surface of the through-hole as shown in FIG. 9E.

Thereby, the shape of the through-hole connecting the pixel electrode 21 with the drain electrode 16b includes an ordinarily directed taper having a smooth transformation, and the yield and the reliability are elevated because steps are not generated and defected pixels are hardly produced.

In accordance with the LCD of the first embodiment, since no overlapping margin for exposure is required between the overcoat 20 and the color filter 19 to reduce a region unrelated with the display, the LCD having a higher aperture rate can be obtained.

Further in the first embodiment, the etching and the baking of the overcoat 20 and the color filter 19 are simultaneously conducted, the number of steps is reduced compared with the case where the etching and the baking are separately conducted. Only one sheet of the photomask for photolithography is sufficient to reduce a cost of manufacturing the mask.

Second Embodiment

Although configuration of an LCD of a second embodiment is substantially the same as that of FIG. 6, the LCD is fabricated in accordance with the following method.

Similarly to the first embodiment, scan lines 13, a gate electrode 13a, a common electrode 24, a gate dielectric 14, a semiconductor layer 15, a signal line 16, a source electrode 16a and a drain electrode 16b are formed on a first transparent dielectric substrate 11. Thereafter, a passivation film 17 is formed by forming a silicon nitride film by a CVD procedure though patterning is not conducted.

Thereafter, similarly to the first embodiment, a color filter 19 and an overcoat 20 are formed. The material of the overcoat 20 is selected to have a resistance to an etchant to the passivation film 17. An example thereof includes hydrofluoric acid.

After the formation of the overcoat 20, the etching of the passivation film 17 is conducted without application of resin. Then, similarly to the first embodiment, a transparent pixel electrode 21 is formed to provide a TFT panel 60.

LC orientation layers made of polyimide are formed on the TFT panel 60 and an counter panel 61.

The both panels 60 and 61 are subjected to a rubbing treatment so that the LCs orientation after 90° twist is obtained. After polymer beads having a diameter corresponding to gaps are scattered on the entire surface and the both panels 60 and 61 are superposed with each other and bonded in a manner that the both LC orientation layers oppose to each other, the LCD is fabricated by injecting nematic LCs in the space between the both panels 60 and 61.

In the LCD of the second embodiment, even if the etching of the passivation film 17 is conducted without application of resin after the formation of the overcoat 20, the overcoat 20 is re-flown to form the gradual slope covering the side surface of the through-hole. Accordingly, the shape of the through-hole connecting the pixel electrode 21 with the drain electrode 16b includes an ordinarily directed taper having a smooth transformation and no steps are generated. Thereby, the yield and the reliability are elevated because defected pixels are hardly produced.

In the second embodiment similarly to the first embodiment, since no overlapping margin is required between the overcoat 20 and the color filter 19, the LCD having a higher aperture rate can be obtained.

Further in the second embodiment, the etching and the baking of the overcoat 20 and the color filter 19 are simultaneously conducted, the number of steps can be reduced. Only one sheet of the photomask for photolithography is sufficient to reduce a cost of manufacturing the mask.

Since the etching of the passivation film 17 is conducted by employing the overcoat 20 as a mask, application of resin, exposure and development are not required for patterning the passivation film 17 to reduce the number of steps. Further, the photomask for photolithography is not required to reduce a cost of manufacturing the mask.

Third Embodiment

Figure 10:
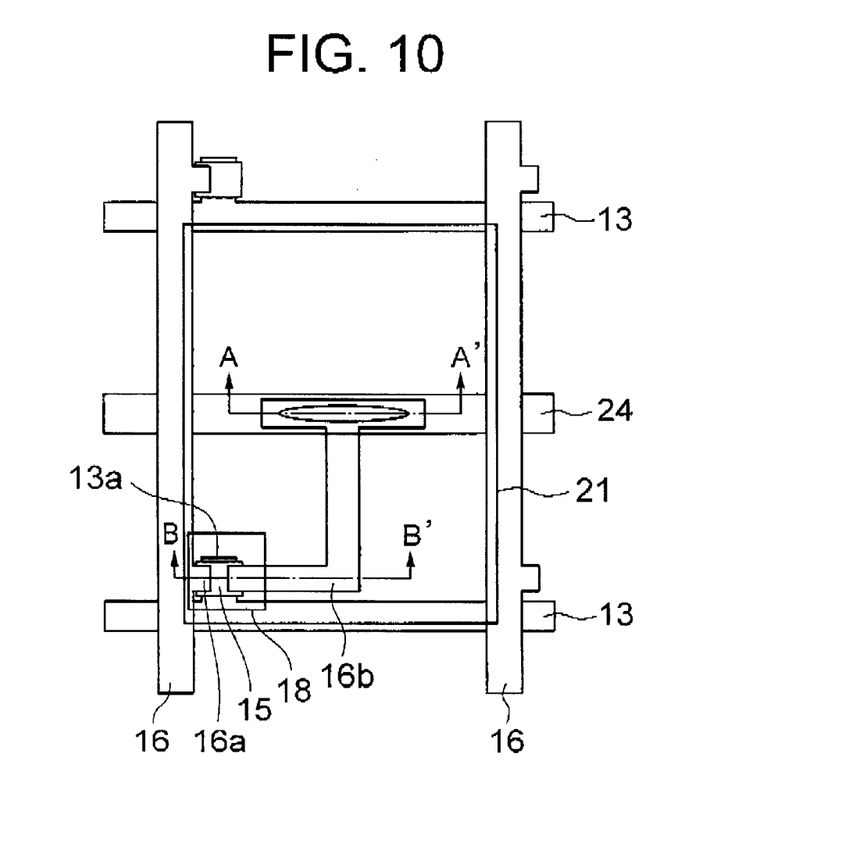
FIG. 10 is a top plan view showing an LCD in accordance with a third embodiment of the present invention.
Figure 11:
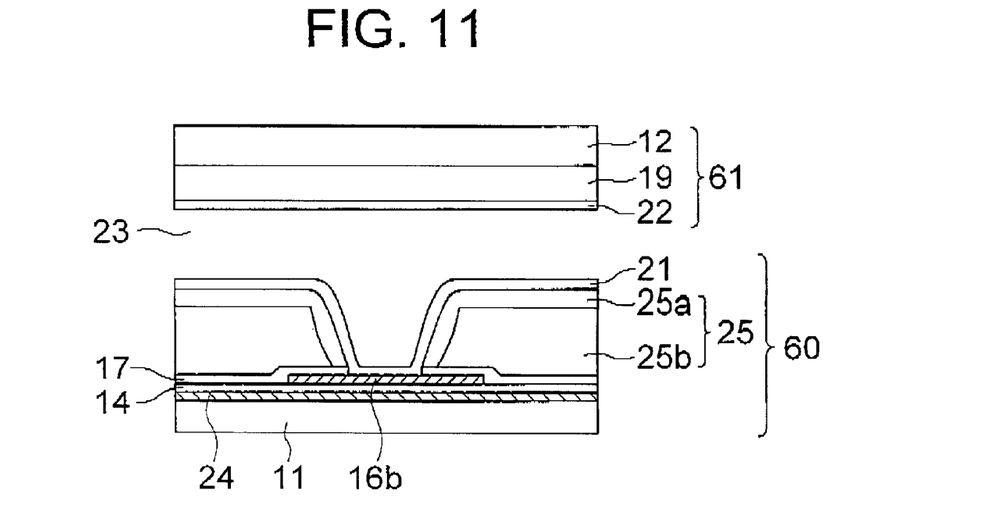
FIG. 11 is a cross sectional view of the LCD shown in FIG. 10 taken along a line A-A'.
Figure 12:
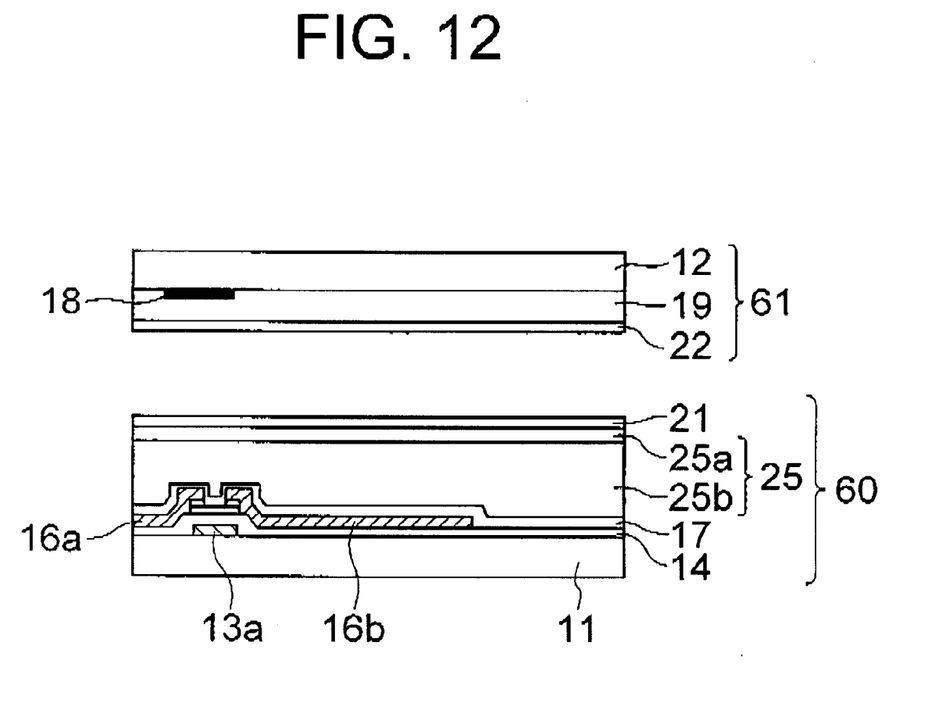
FIG. 12 is a cross sectional view of the LCD shown in FIG. 10 taken along a line B-B'.

As shown in FIGS. 10 to 12, and LCD of a third embodiment includes a TFT panel 60 and a counter panel 61.

The TFT panel 60 includes a transparent dielectric substrate 11 on which scan lines 13, a gate electrode 13a connected thereto and a common electrode 24 are disposed. A gate dielectric film 14, a semiconductor layer 15, signal lines 16, a source electrode 16a connected thereto, a drain electrode 16b, and a passivation layer 17 are disposed on the common electrode 24.

An interlayer dielectric film 25 including a photosensitive film 25a and a non-photosensitive film 25b is disposed on the passivation film 17. The film 25b is a first interlayer dielectric film and the layer 25a is a second interlayer dielectric film.

A through-hole is formed in the interlayer dielectric film 25, and the side surface of the through-hole is covered with the photosensitive interlayer dielectric film 25. A pixel electrode 21 connected to the drain electrode 16b of a TFT through the through-hole is formed on the interlayer dielectric film 25. An LC orientation layer not shown in the drawings is disposed thereon.

A black matrix 18, a color filter 19 and a transparent counter electrode 22 are disposed on a transparent dielectric substrate 12 of the counter panel 61. An LC orientation layer not shown in the drawings is disposed on the counter electrode 22.

The TFT panel 60 and the counter panel 61 are disposed so that the respective LC orientation layers are opposed to each other, and an LC layer 23 is formed between the counter LC orientation layers.

A method of fabricating the LCD having the configuration will be described.

At first, similarly to the first embodiment, scan lines 13, a gate electrode 13a, a gate dielectric film 14, a semiconductor layer 15, a signal line 16, a source electrode 16a and a drain electrode 16b and a passivation layer 17 are formed on a transparent dielectric substrate 11.

Acryl-based highly transparent polymer having a thickness of about 4 μm is applied on the TFT fabricated in this manner by spin-coating.

A solvent is volatized by pre-baking the wafer at 100° C. on a hot plate for 1 minute to provide the interlayer dielectric film 25b in a semi-cured state. Since the interlayer dielectric film 25b is non-photosensitive, the highly transparent film having a transmission factor in a visible light band of 99% or more can be obtained even if a thickness thereof is 4 μm.

A positive photosensitive and highly transparent resin material is spin-coated on the interlayer dielectric film 25b to have a thickness of about 0.5 μm and pre-baked for 1 minute on a hot plate having a temperature of 80° C. to provide an interlayer dielectric film 25a.

The solvent is so selected that the solvent of the upper interlayer dielectric film 25a does not invade the lower interlayer dielectric film 25b. Then, a light having an energy of about 100 mJ/cm$^2$ is irradiated by employing a stepper to expose the interlayer dielectric film 25a.

The dielectric substrate 11 is dipped in alkaline developer (containing 2.38% of TMAH) for 120 seconds for development. Simultaneously with the development, the interlayer dielectric films 25a and 25b are dry-etched.

After the development, the entire surface of the dielectric substrate 11 is exposed to light at an energy density of 300 mJ/cm$^2$. This step facilitates the reaction of the photosensitive group in the interlayer dielectric film 25a and elevates the transparency. Although the interlayer dielectric film 25a has a lower transmission factor compared with non-photosensitive material due to its photosensitivity, a transmission factor in a visible light band is 99% or more because a thickness thereof is as low as 0.5 μm. The transmission factor in the visible light band after the light passes through the interlayer dielectric films 25a and 25b is 98% or more. A ratio of converting white into yellow is lower compared with the above-described latter prior art in which the interlayer dielectric film 25 is made of only photosensitive resin.

The heating of the interlayer dielectric film 25a in an oven at a temperature higher than the glass transition point thereof changes the shape of the interlayer dielectric film 25a to form a gradual slope covering the side surface of the through-hole.

A transparent dielectric film which may be spin-coated such as a polyimide film can be used as the material of the interlayer dielectric films 25a and 25b other than the acryl-based polymer employed herein.

The pixel electrode 21 is formed by preparing an ITO (Indium-Tin-Oxide) film on the overcoat 20 by sputtering and patterning. In this manner, the TFT panel 60 is obtained.

A black matrix 18 and a color filter 19 are photolithographically formed on the other transparent dielectric substrate 12, and a counter electrode 22 is formed by sputtering an ITO film.

LC orientation layers made of polyimide are formed on the TFT panel 60 and a counter panel 61. The both panels 60 and 61 are subjected to a rubbing treatment so that the LC orientation after 90° twist is obtained. After polymer beads having a diameter corresponding to gaps are scattered on the entire surface and the both panels 60 and 61 are superposed with each other and bonded in a manner that the both LC orientation layers oppose to each other, the LCD is fabricated by injecting nematic LCs in the space between the both panels 60 and 61.

In the LCD of the third embodiment similarly to the first embodiment, since the interlayer dielectric film is re-flown to form the gradual slope covering the side surface of the through-hole, the shape of the through-hole connecting the pixel electrode 21 with the drain electrode 16b includes an ordinarily directed taper having a smooth transformation and no steps are generated in the pixel electrode 21. Thereby, the yield and the reliability are elevated because defected pixels are hardly produced.

In the third embodiment, the most part of the interlayer dielectric film 25b scarcely includes the photosensitive group to maintain a considerably high transmission rate, and a highly bright display can be obtained.

Fourth Embodiment

A fourth embodiment is made by modifying a part of the third embodiment.

In the fourth embodiment similarly to the third embodiment, scan lines 13, a gate electrode 13a, a common electrode 24, a gate dielectric film 14, a semiconductor layer 15, a signal line 16, a source electrode 16a and a drain electrode 16b are formed on one of a pair of transparent dielectric substrates 11. Thereafter, a passivation film 17 is formed by forming a silicon nitride film by a CVD procedure though patterning is not conducted.

Thereafter, similarly to the third embodiment, interlayer dielectric films 25a and 25b are formed. The material of the interlayer dielectric film 25b is selected to have a resistance to an etchant to the passivation film 17. An example thereof includes hydrofluoric acid.

After the formation of the interlayer dielectric film 25, the etching of the passivation film 17 is conducted without application of resin. Then, similarly to the third embodiment, a transparent pixel electrode 21 is formed to provide a TFT panel 60.

LC orientation layers made of polyimide are formed on the TFT panel 60 and a counter panel 61.

The both panels 60 and 61 are subjected to a rubbing treatment so that the LC orientation after 90° twist is obtained. After polymer beads having a diameter corresponding to gaps are scattered on the entire surface and the both panels 60 and 61 are superposed with each other and bonded in a manner that the both LC orientation layers oppose to each other, the LCD is fabricated by injecting nematic LCs in the space between the both panels 60 and 61.

In the LCD of the fourth embodiment, even if the etching of the passivation film 17 is conducted without application of resin after the formation of the interlayer dielectric film 25, the interlayer dielectric film 25 is re-flown to form the gradual slope covering the side surface of the through-hole. Accordingly, the shape of the through-hole connecting the pixel electrode 21 with the drain electrode 16*b* includes an ordinarily directed taper having a smooth transformation and no steps are generated. Thereby, the yield and the reliability are elevated because defected pixels are hardly produced.

In the fourth embodiment, the most part of the interlayer dielectric film 25*b* scarcely includes the photosensitive group to maintain a considerably high transmission rate, and a highly bright display can be obtained.

Since the etching of the passivation film 17 is conducted by employing the interlayer dielectric film 25*b* as a mask, application of resin, exposure and development are not required for patterning the passivation film 17 to reduce the number of steps. Further, the photomask for photolithography is not required to reduce a cost of manufacturing the mask.

Since the above embodiments are described only for examples, the present invention is not limited to the above embodiments and various modifications or alternations can be easily made therefrom by those skilled in the art without departing from the scope of the present invention.

What is claimed is:

1. A liquid crystal display (LCD) device comprising:

first and second transparent panels; and liquid crystal sandwiched between said first transparent panel and said second transparent panel, said first transparent panel including a dielectric substrate, a plurality of pixel elements arranged in a matrix overlying said dielectric substrate, each of said pixel elements having a TFT, an associated pixel electrode, and first and second dielectric films covering said TFT and having a through-hole for said TFT, a plurality of scan lines each connected to gates of said TFTs in a corresponding row of said pixel elements, a plurality of signal lines each connected to source electrodes in a corresponding column of said pixel elements, and drain electrodes connected to the pixel electrode via said through-holes, said first dielectric film being made of non-photosensitive resin, said second dielectric film being made of photosensitive resin and covering an inner side wall of each said through-hole.

2. The LCD device as defined in claim 1, wherein said first dielectric film is a color filter and said second dielectric film is a transparent overcoat.

3. The LCD device as defined in claim 1, wherein both said first and second dielectric films are interlayer films made of transparent resin.

4. The LCD device as defined in claim 1, wherein said first and second dielectric films have a total thickness of 3 μm or more.

5. A method for fabricating a TFT panel for use in an LCD device, comprising the steps of:

forming a TFT overlying a first transparent dielectric substrate;

forming a non-photosensitive first dielectric film overlying the TFT;

forming a photosensitive second dielectric film on the first dielectric film;

exposing the second dielectric film to light by using a photomask to form a wafer;

dipping the wafer in an alkaline developer for development;

exposing the wafer for exposure;

heating the second dielectric film at a temperature higher than a glass transition point of the second dielectric film; and forming a pixel electrode overlying the second dielectric film.

6. The method for fabricating the TFT panel as defined in claim 5, wherein the TFT forming step includes the steps of:

forming a metal film on the first transparent dielectric substrate by photolithographic patterning;

forming scan lines, gate electrodes and common electrodes;

forming a silicon nitride film acting as a gate dielectric film on an entire surface of the common electrode;

forming and patterning a semiconductor layer by consecutively forming a non-doped amorphous silicon film and a doped amorphous silicon film overlying the gate dielectric film; and forming a passivation layer by forming and patterning a silicon nitride layer.

7. The method for fabricating the TFT panel as defined in claim 5, wherein the first dielectric film forming step includes the steps of:

applying non-photosensitive resin to form the first dielectric film having a specified thickness; and forming a color filter in a semi-cured state by heating the non-photosensitive resin; and the second dielectric film forming step includes the steps of:

applying photosensitive and transparent resin on the color filter; and forming an overcoat by heating the photosensitive and transparent resin.

8. The method for fabricating the TFT panel as defined in claim 7, wherein a temperature of heating the photosensitive and transparent resin is lower than that of heating the non-photosensitive resin.

9. The method for fabricating the TFT panel as defined in claim 5, wherein after the second dielectric film is heated, the second dielectric film and underlying layers below the second dielectric film are etched in the second dielectric film heating step.

10. The method for fabricating the TFT panel as defined in claim 5, wherein the first dielectric film forming step includes the steps of:

forming a first interlayer dielectric film made of non-photosensitive transparent resin; and forming a second interlayer dielectric film made of photosensitive transparent resin on the first interlayer dielectric film.

11. The method for fabricating the TFT panel as defined in claim 10, wherein after the second interlayer dielectric film is formed, the second interlayer dielectric film and underlying layers below the second interlayer dielectric film are etched.

12. The method for fabricating the TFT panel as defined in claim 9 further comprising a step of forming a passivation layer by forming and patterning a silicon nitride layer and etching the passivation layer.

13. The method for fabricating the TFT panel as defined in claim 11 further comprising a step of forming a passivation layer by forming and patterning a silicon nitride layer and etching the passivation layer.

* * * * *